United States Patent Office 3,491,081
Patented Jan. 20, 1970

3,491,081
INSOLUBLE MONO- AND DISAZO DYESTUFFS CONTAINING A 1,3 - BENZOXAZOLIN - 2 - ONE GROUP
Gerhard Wolfrum, Opladen, and Rolf Pütter, Dusseldorf, Germany, assignors to Farbenfabriken Bayer Aktiengesellschaft, Leverkusen, Germany, a corporation of Germany
No Drawing. Filed May 9, 1966, Ser. No. 548,419
Claims priority, application Germany, May 15, 1965, F 46,063
Int. Cl. C09b *31/06, 29/36;* C07d *85/38*
U.S. Cl. 260—157          7 Claims

ABSTRACT OF THE DISCLOSURE

An azo dyestuff of the formula:

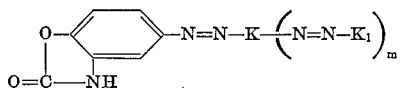

wherein K is the residue of a coupling component of the aromatic or heterocyclic series, m is 0 when K is the residue of a coupling component of the 1-alkyl or 1-arylpyrazole series and m is 0 or 1 when K is the residue of a coupling component of the aromatic series; said azo dyestuff being free of sulphonic and carboxylic acid groups. The dyestuffs are suitable for dyeing and printing cellulose ester and polyamide fibers as well as threads, tapes, films, and other materials formed from aromatic polyesters.

---

It has been found that valuable azo dyestuffs insoluble in water are obtained when the diazonium compound of 5-amino-benzoxazolin-(1,3)-one-(2) of the composition

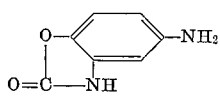

is combined with coupling components from the aromatic or 1-alkyl- or 1-aryl-pyrazole series, the resultant dyestuffs are optionally further diazotised and again combined with a coupling component from the aromatic or heterocyclic series, starting components being selected which are free from sulphonic acid and carboxylic acid groups.

Principal examples of coupling components are those of the phenol, naphthol, aminobenzene, aminonaphthalene, 1-alkyl- or 1-aryl-5-pyrazolone and 1-alkyl- or 1-aryl-5-amino-pyrazole series. Apart from sulphonic acid and carboxylic acid groups, they may possess the usual substituents, such as alkyl, aryl, halogen, carboxylic acid alkyl ester groups, alkoxy, aryloxy and acylamino groups.

When aromatic amines are employed as the coupling components, they may also be mono- and di-substituted at the amino group, for instance by alkyl or aryl radicals, both of which types of radical may be further substituted, for instance by halogen, hydroxy, acyloxy, cyano or thiocyano groups.

When primary aromatic amines which couple in the p-position relative to the amino group, are employed as the coupling components, the monoazo dyestuffs obtainable by this method, which correspond for instance to the composition

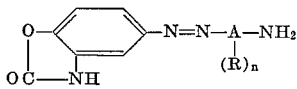

wherein A stands for a p-phenylene or p-naphthylene residue, R denotes hydrogen or a non-ionic substituent and n is the integer 1 or 2, can be further diazotised and coupled to form disazo dyestuffs, for instance with phenols or naphthols. The phenols or naphthols employed as the coupling components for this purpose should also be free from sulphonic acid and carboxylic acid groups but they may contain non-ionic substituents, such as alkyl or aryl radicals, alkoxy or aryloxy groups or halogen atoms.

The 5-amino-benzoxazolinone-(2) employed as the diazo component can readily be prepared from 4-nitro-2-aminophenol by its reaction with phosgene to form 5-nitro-benzoxazolinone-(2) (M.P. 226–228° C.) and reduction of this nitro compound to form 5-amino-benzoxazolinone-(2) (M.P. 206–208° C., with decomposition), for instance by means of iron. The 5-amino-benzoxazolinone-(2) can be smoothly diazotised as its solution in an aqueous inorganic acid.

The following may for instance be employed as the coupling components:

1-phenyl-3-methyl-pyrazolone-(5),
1-(β-cyanoethyl)-3-methyl-pyrazolone-(5),
1-(β-hydroxyethyl)-3-methyl-pyrazolone-(5),
1,3-diphenyl-pyrazolone-(5),
phenol,
4-methyl-phenol,
3-methyl-phenol,
3-methoxy-phenol,
3-chloro-phenol
4-hydroxy-diphenyl,
aniline,
1-amino-2-methyl-benzene,
1-amino-3-methyl-benzene,
1-amino-3-chloro-benzene,
1-amino-2-methoxy-benzene,
1-amino-3-methoxy-benzene,
1-amino-3-methyl-6-methoxy-benzene,
1-amino-2,5-dimethyl-benzene,
1-amino-2,5-dimethoxy-benzene,
N,N-dimethylaniline,
N,N-diethylaniline,
N-ethyl-N-β-cyanoethyl-aniline,
N,N-bis-(β-cyanoethyl)-aniline,
N,N-bis-(β-hydroxyethyl)-aniline,
N-methyl-diphenylamine,
1-hydroxy-naphthalene,
1-hydroxy-4-chloro-naphthalene,
1-hydroxy-4-methoxy-naphthalene,
1-hydroxy-naphthalene-4-sulphonic acid-β-hydroxyethylamide,
1-hydroxy-naphthalene-5-sulphonic acid-diethylamide,
2-hydroxy-naphthalene,
2-hydroxy-naphthalene-3-carboxylic acid ethyl ester,
1-amino-naphthalene, and
1-amino-5-hydroxy-naphthalene.

The azo dyestuffs obtainable according to the process correspond to the formula

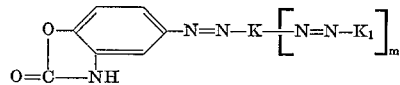

wherein K represents the radical of a coupling component from the aromatic or 1-alkyl- or 1-aryl-pyrazole series and $K_1$ denotes the radical of a coupling component from the aromatic or heterocyclic series; m stands for the number 0 when K represents the radical of a 1-alkyl- or 1-aryl-pyrazole and for the number 0 or 1 when K represents an aromatic radical; the dyestuffs are free from sulphonic acid and carboxylic acid groups but may possess other non-ionic substituents. It is preferred that K and $K_1$ stand for the residue of a coupling component of a group consisting of:

(A)
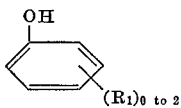

wherein $R_1$ is lower alkyl, lower alkoxy, phenyl, or halogen;

(B)
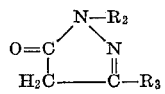

wherein $R_2$ is phenyl, cyanoethyl, or hydroxyethyl, and $R_3$ is methyl or phenyl;

(C)
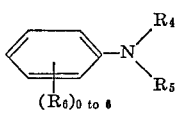

wherein $R_4$ and/or $R_5$ are hydrogen, methyl, ethyl, phenyl, cyanoethyl, hydroxyethyl, ethoxy carbonyl ethyl, or [pyrrolidonyl-(1)] ethyl, and $R_6$ is methyl, methoxy, or chlorine and is not in the 4-position; and (D)
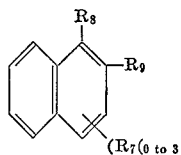

wherein $R_8$ and $R_9$ are different members selected from the group consisting of hydrogen, hydroxy, and amino, and $R_7$ is selected from the group consisting of chlorine, methoxy, carboxylic acid ethyl ester, sulphonic acid hydroxy ethyl amide, and sulphonic acid diethyl amide wherein M is 0 when K is (B) and $m$ is 0 or 1 when K is (A), (C), or (D), said azo dyestuff being free of sulphonic acid and carboxylic acid groups.

They are suitable for dyeing and printing cellulose ester fibres, polyamide fibres and materials, such as threads, tapes, films and the like from aromatic polyesters, especially from polyterephthalic acid glycol esters. The dyeings exhibit excellent wet fastness properties. In addition, the dyeings on polyterephthalic acid esters also exhibit excellent fastness towards sublimation and very good light fastness.

Since the dyestuffs are insoluble in water or only very sparsely soluble, the dyeing process is carried out in the presence of compounds with a dispersing action; in addition, swelling agents (carriers) may be added to the dyeing liquor in order to accelerate the dyeing process.

The parts specified in the following examples, given for the purpose of illustrating the invention, are parts by weight.

EXAMPLE 1

15 parts 5-amino-benzoxazolin-(1,3)-one-(2) are dissolved in a mixture of 25 parts of concentrated hydrochloric acid and 100 parts water, and diazotised at 0–3° C. with a solution of 6.9 parts sodium nitrite in 40 parts water. After removal of the excess of nitrous acid with amidosulphonic acid, the clear diazo solution is added to a weakly alkaline solution of 11 parts p-cresol in 50 parts water. Coupling, which starts at once, is completed within a short while and the dyestuff can be filtered off, washed with water and dried. 25.2 parts of a brown dyestuff powder are obtained. The dyestuff has the composition

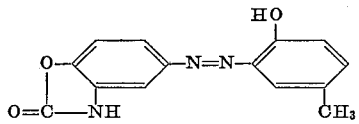

10 parts of the resultant dyestuff powder are ground in a ball mill for 24 hours together with 20 parts of a condensation product from β-naphthalene-sulphonic acid and formaldehyde and with 10–20 parts water. The paste is subsequently dried in vacuo and the residue is finely ground.

3 parts of the dyestuff powder thus obtained are stirred into 2000 parts of hot water containing 8–10 parts of a carrier, for instance 2-hydroxy-diphenyl, adjusted to a pH value of about 4.5 by means of sulphuric acid. A very fine dyestuff dispersion is thus obtained, and 50 parts of polyester fibres are introduced into it at 40–60° C. The dye liquor is heated to boiling in 20–30 minutes and maintained at this temperature for 1 to 1½ hours. The dyed material is thereafter thoroughly rinsed with hot water and dried. A somewhat greenish yellow dyeing is obtained, having very good wet fastness properties, very good fastness towards sublimation and very good fastness towards daylight.

If in this Example p-cresol is replaced by phenol, m-cresol, resorcinol monomethyl ether or m-chlorophenol, dyestuffs are obtained which again dye polyester fibres in yellow shades having good to very good fastness properties.

Dyeings with a similar shade and similar fastness properties are obtained on cellulose ester fibres and polyamide fibres according to the dyeing procedures usual for such fibres.

EXAMPLE 2

15 parts 5-amino-benzoxazolin-(1,3)-one-(2) are diazotised as described in Example 1, and the diazo solution is combined at 0–5° C. with a solution of 16.1 parts N-methyl-N-β-cyanoethyl-aniline in 80 parts water and 25 parts of concentrated hydrochloric acid. Coupling is thereafter completed by the addition of concentrated sodium acetate solution. The resultant dyestuff is isolated by filtration, washed with water and dried. 30.7 parts of a yellow dyestuff powder are obtained, which dyes polyester fibres according to the procedure of Example 1 to somewhat reddish yellow shades. The dyeings have excellent fastness properties towards wetting and sublimation and have very good fastness to light.

Further valuable dyestuffs are obtained by coupling diazotised 5-amino-benzoxazolin-(1,3)-one-(2) with the amines of the following table:

| Azo components: | Colour shade on polyester fibres |
| --- | --- |
| N,N-diethylaniline | reddish yellow |
| N,N-ethyl-β-hydroxyethylaniline | reddish yellow |
| N,N-bis-β-hydroxyethylaniline | reddish yellow |
| N,N-ethyl-β-[pyrrolidonyl-(1)]-ethylaniline | reddish yellow |
| N-phenyl-N'-acetylpiperazine | yellow |
| N,N-diethyl-m-toluidin | strongly reddish yellow |
| N,N-diethyl-m-chloroaniline | yellowish orange |
| N-methyl-diphenylamine | yellowish orange |
| N,N-ethyl-benzylaniline | yellowish orange |
| N,N-ethyl-β-cyanethylaniline | reddish yellow |
| N,N-ethyl-β-ethoxycarbonylethyl-aniline | reddish yellow |

EXAMPLE 3

15 parts 5-amino-benzoxazolin-(1,3)-one-(2) are diazotised as in Example 1 and the diazo solution is combined at 0–5° C. and at pH 6–7 with a solution of 17.6 parts 1-phenyl-3-methyl-pyrazolone-(5) in 400 parts water. A pH value of 6–7 is maintained by the addition of dilute sodium hydroxide solution. Coupling is completed within a short while and the dyestuff can be filtered off, washed with water and then dried. 32.1 parts of a yellow dyestuff powder are obtained. The dyestuff dyes polyester fibres in yellow shades having very good fastness properties towards wetting, sublimation and daylight.

EXAMPLE 4

15 parts 5-amino-benzoxazolin-(1,3)-one-(2) are diazotised as described in Example 1, and the diazo solution is combined at 0–5° C. with a solution of 10.9 parts m-toluidine in 100 parts water and 25 parts of concentrated hydrochloric acid. A pH value of about 4–5 is adjusted by the addition of sodium acetate solution. When coupling has been completed, the dyestuff is filtered off and repeatedly washed with water. Whilst it is still damp, the dyestuff is dissolved by heating in 1000 parts water, with the careful addition of a little hydrochloric acid. The solution is then very rapidly cooled down to 0–5° C. and treated with 25 parts of concentrated hydrochloric acid. The fine dispersion of the dyestuff hydrochloride is thereafter diazotised at 3–10° C. with a solution of 6.9 parts sodium nitrite in 30 parts water. The resultant clear diazo solution is freed from the excess of nitrous acid by means of amidosulphonic acid and then gradually added by portions to a solution of 12.4 parts 3-methoxy-phenol in 100 parts water containing 15 parts of dissolved sodium hydroxide. After coupling has been completed, the resultant disazo dyestuff of the composition

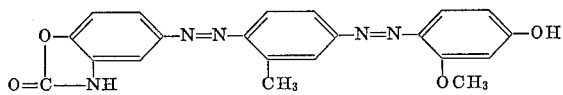

is filtered off, washed with water and dried.

When dyed on polyester fibres according to the procedure of Example 1, this dyestuff produces a yellowish orange shade having very good fastness properties towards wetting, sublimation and daylight.

Further disazo dyestuffs available in accordance with the invention are listed in the following table, these being obtained when diazotised 5-amino-benzoxazolin-(1,3)-one-(2) is first coupled with the amines in column 1, and when the monoazo dyestuffs thus prepared are again diazotised and coupled with the phenols in column 2:

| Ex. | 1 | 2 | Colour shade on polyester fibres |
|---|---|---|---|
| 5 | -NH₂ with CH₃ | -OH | Strongly reddish yellow. |
| 6 | -NH₂ with CH₃ | -OH with CH₃ | Strongly yellowish orange. |
| 7 | -NH₂ with OCH₃, CH₃ | -OH | Strongly reddish yellow. |
| 8 | -NH₂ with OCH₃, CH₃ | -OH with CH₃ | Brownish orange. |
| 9 | -NH₂ with OCH₃, CH₃ | -OH with Cl | Very strongly reddish yellow. |
| 10 | -NH₂ with OCH₃, OCH₃ | -OH | Orange. |

We claim:

1. An azo dyestuff of the formula:

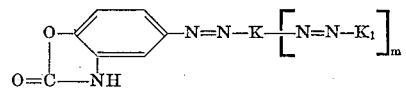

where K and K₁ stand for the residue of a coupling component of the group consisting of (A)

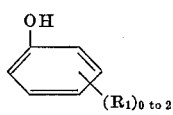

wherein $R_1$ is lower alkyl, lower alkoxy, phenyl, or chlorine (B)

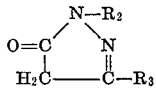

wherein $R_2$ is phenyl, cyanoethyl or hydroxyethyl; and $R_3$ is methyl or phenyl (C)

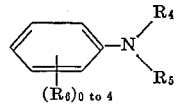

wherein $R_4$ and $R_5$ are each hydrogen, methyl, ethyl, phenyl, cyanoethyl, hydroxyethyl or ethoxy carbonyl ethyl or together [pyrrolidonyl-(1)] ethyl and, $R_6$ is methyl, methoxy, or chlorine and is not in the 4 position (D)

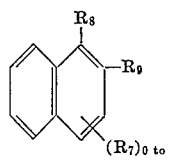

wherein $R_8$ and $R_9$ are different members selected from the group consisting of hydrogen, hydroxy, and amino and $R_7$ is selected from the group consisting of chlorine, methoxy, carboxylic acid ethyl ester, sulphonic acid hydroxy ethyl amide, and sulphonic acid diethyl amide wherein M is 0 when K is (B) and m is 0 or 1 when K is (A), (C) or (D) said azo dyestuff being free of sulphonic acid and carboxylic acid groups.

2. The dyestuff of the formula

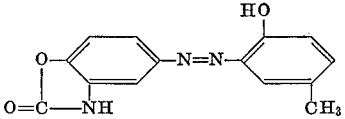

3. The dyestuff of the formula

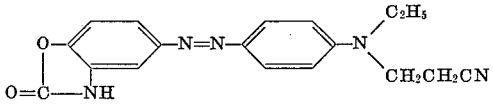

4. The dyestuff of the formula

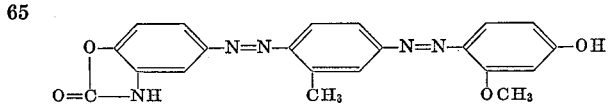

5. The dyestuff of the formula

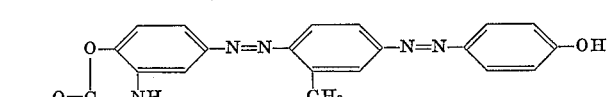

6. The dyestuff of the formula
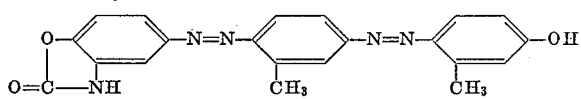
7. The dyestuff of the formula
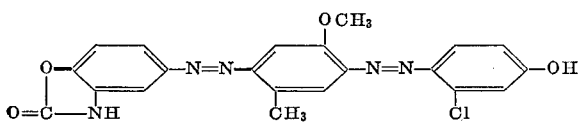
References Cited
UNITED STATES PATENTS
| | | | |
|---|---|---|---|
| 2,055,741 | 9/1936 | Ballauf | 260—157 |
| 2,829,138 | 4/1958 | Kuster | 260—157 XR |
| 3,337,521 | 8/1967 | Hertel et al. | 260—157 XR |
FLOYD D. HIGEL, Primary Examiner
U.S. Cl. X.R.
8—41, 50; 117—121; 260—307, 310